March 14, 1933.  A. DINA  1,900,920
GATE FOR MOTION PICTURE MACHINES
Filed Nov. 4, 1929  8 Sheets-Sheet 1

INVENTOR
Augusto Dina
BY
Howard W. Dix
ATTORNEY

March 14, 1933. A. DINA 1,900,920
GATE FOR MOTION PICTURE MACHINES
Filed Nov. 4, 1929 8 Sheets-Sheet 2
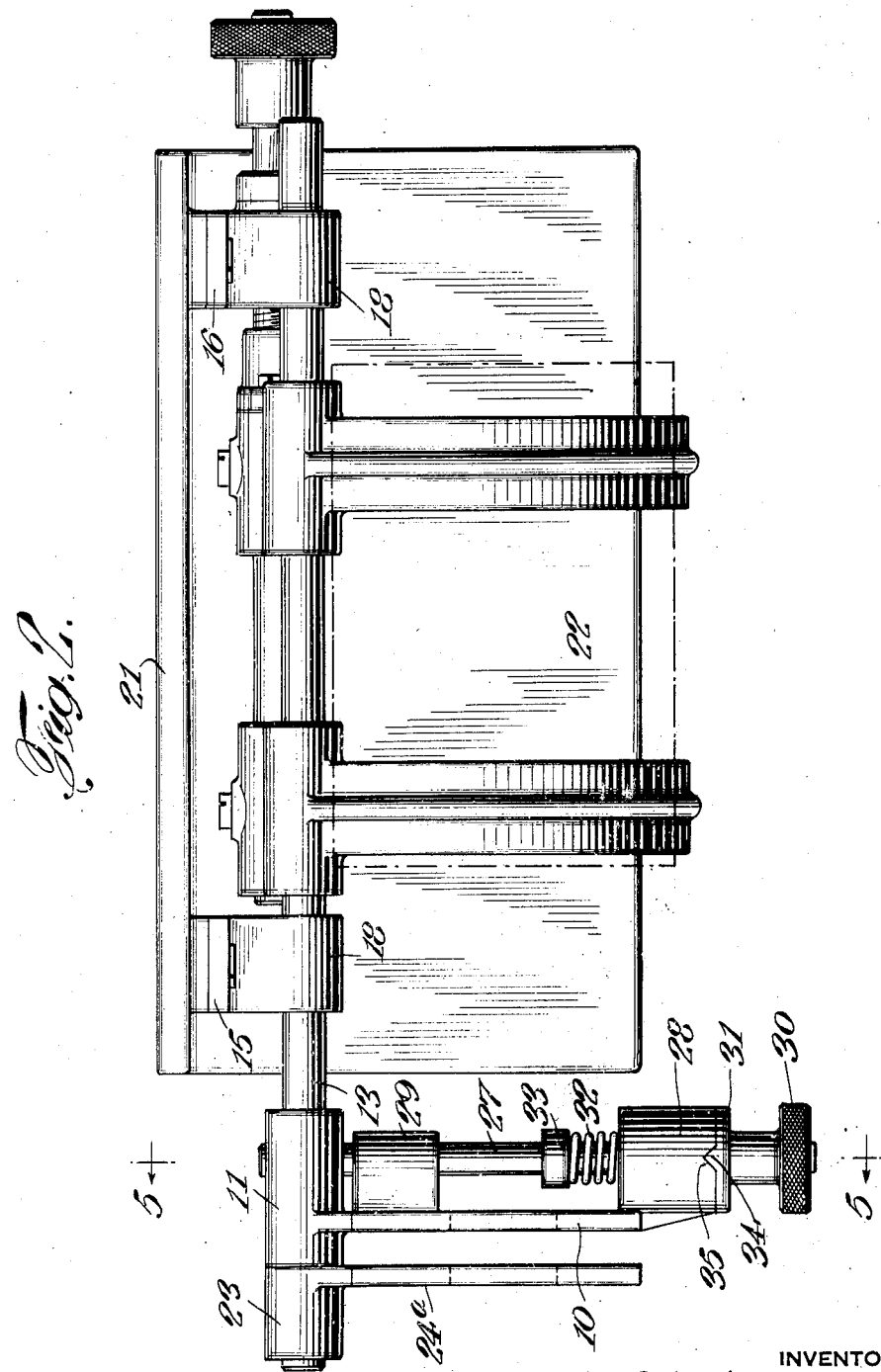
INVENTOR
Augusto Dina
BY
Howard W. Dix
ATTORNEY March 14, 1933.  A. DINA  1,900,920
GATE FOR MOTION PICTURE MACHINES
Filed Nov. 4, 1929   8 Sheets-Sheet 3
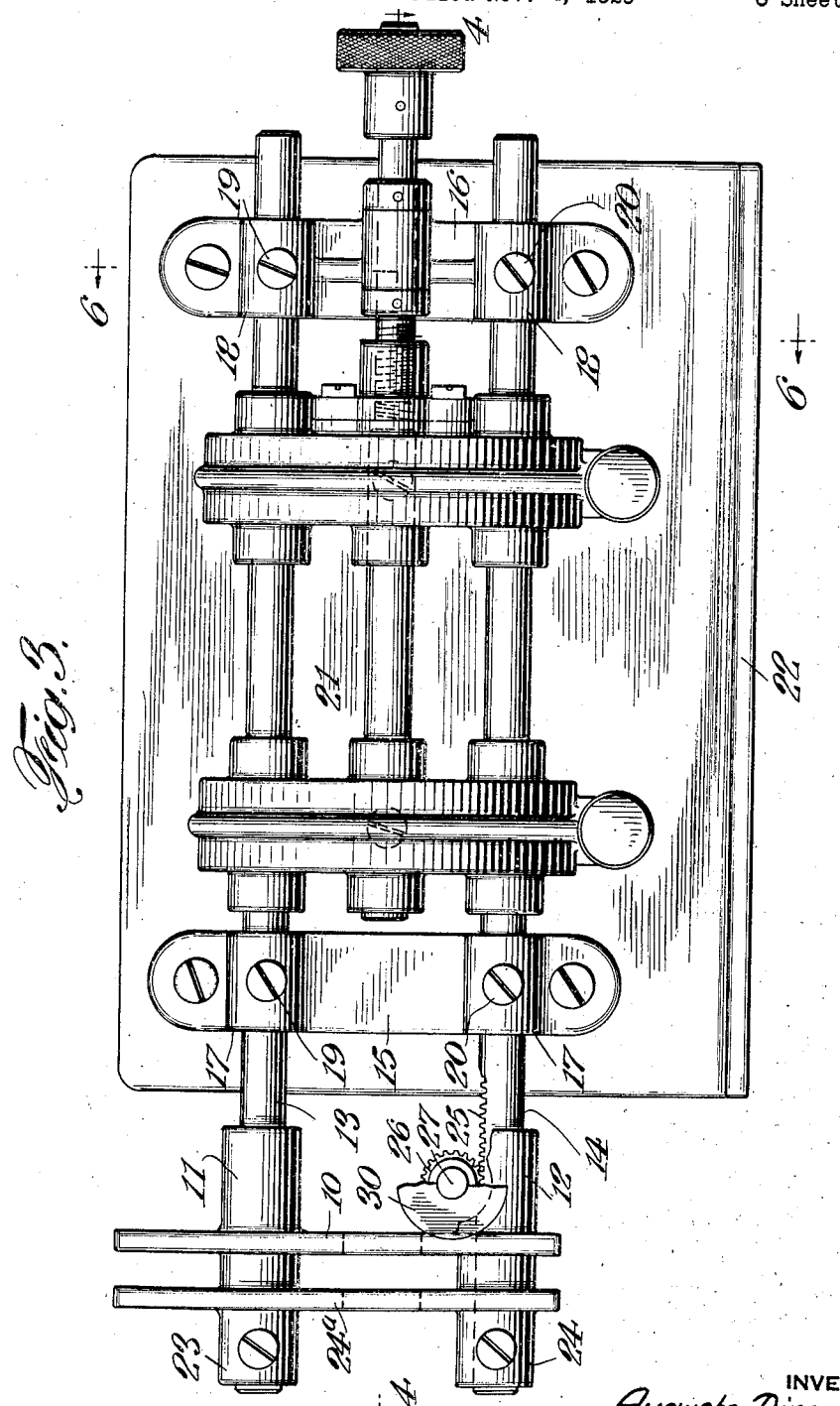
INVENTOR
Augusto Dina
BY
ATTORNEY March 14, 1933.  A. DINA  1,900,920
GATE FOR MOTION PICTURE MACHINES
Filed Nov. 4, 1929   8 Sheets-Sheet 4
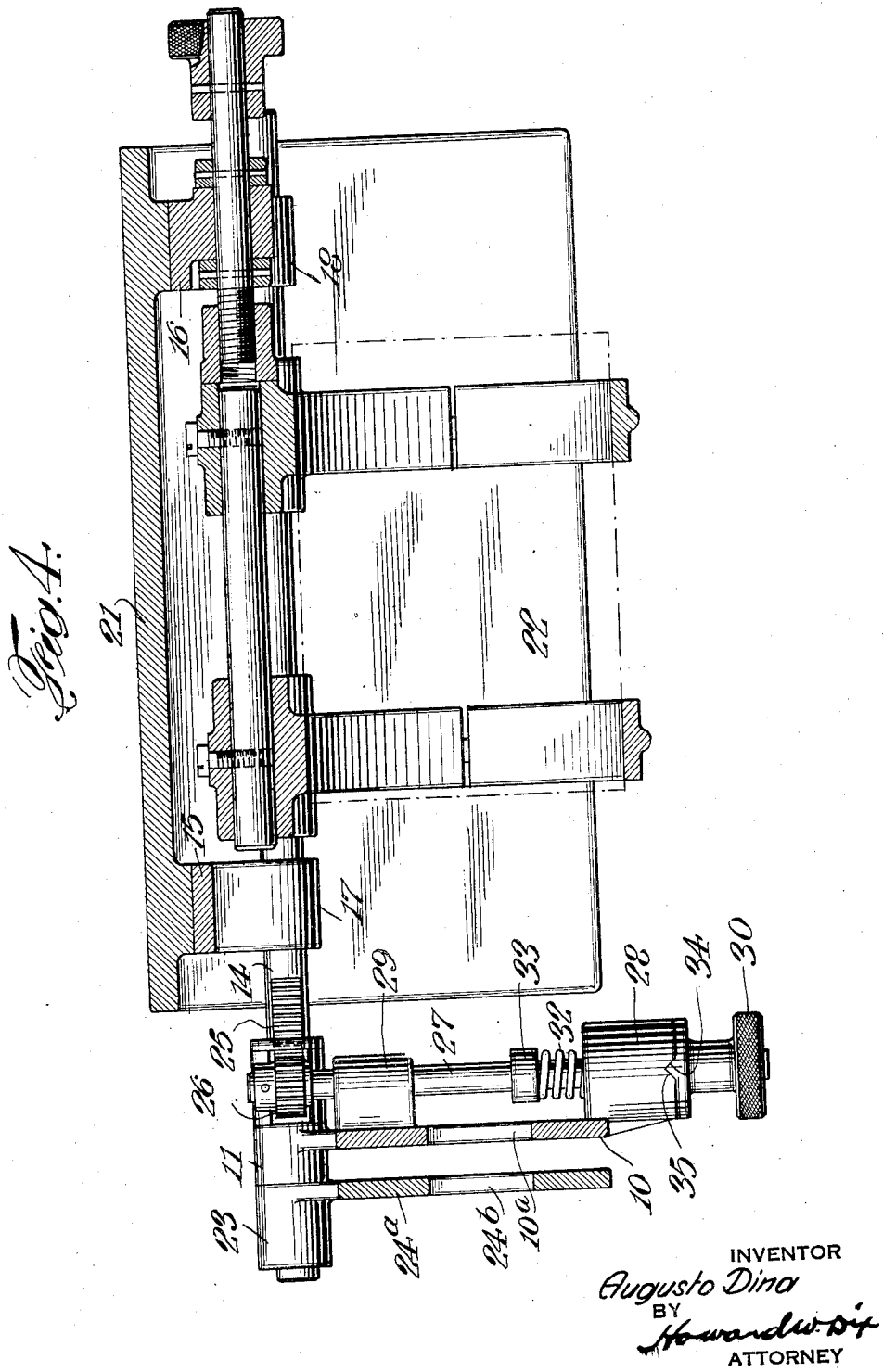
INVENTOR
Augusto Dina
BY
Howard W. Dix
ATTORNEY March 14, 1933. A. DINA 1,900,920
GATE FOR MOTION PICTURE MACHINES
Filed Nov. 4, 1929 8 Sheets-Sheet 5
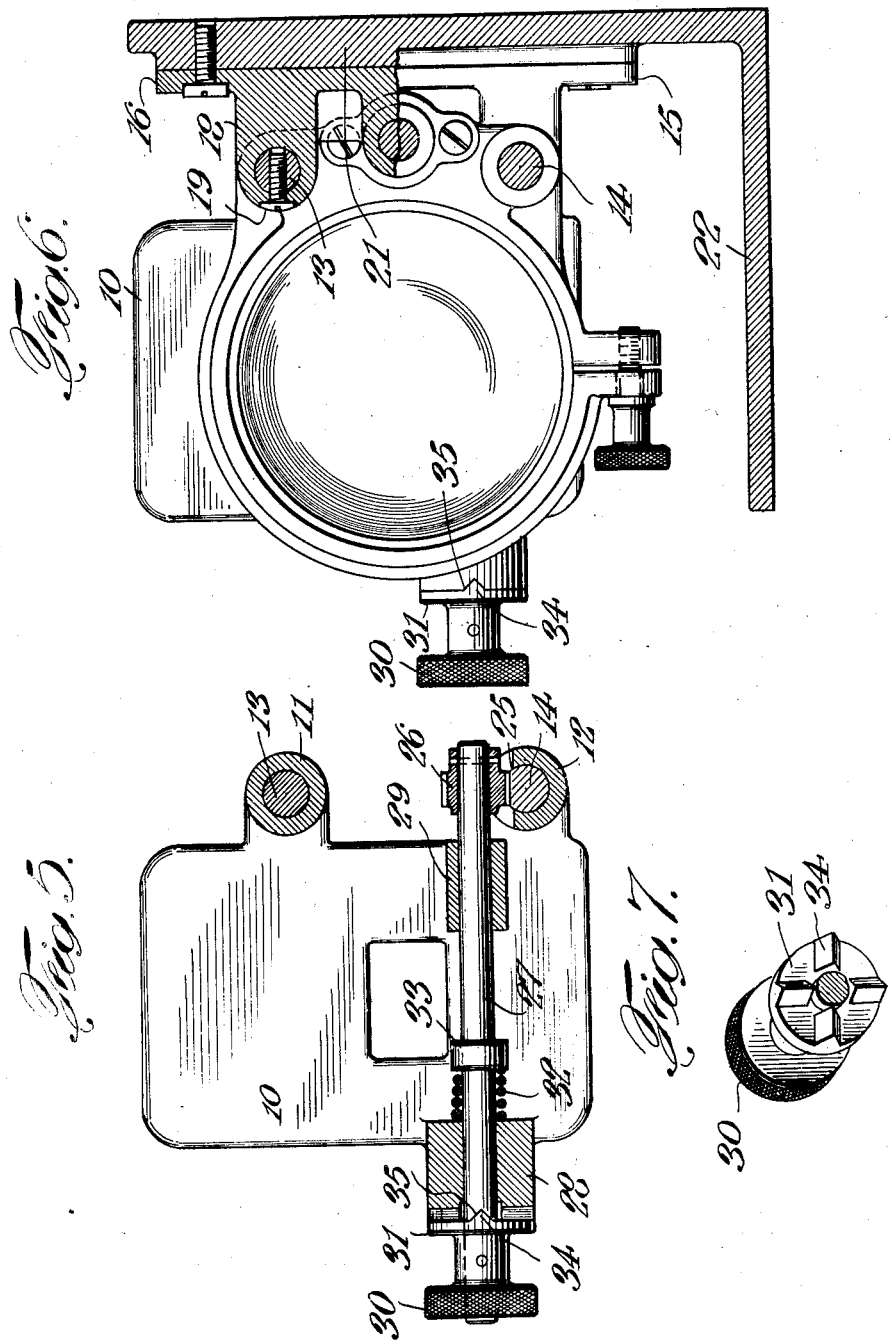
INVENTOR
Augusto Dina
BY
Howard W. Dit
ATTORNEY March 14, 1933.  A. DINA  1,900,920
GATE FOR MOTION PICTURE MACHINES
Filed Nov. 4, 1929  8 Sheets-Sheet 6
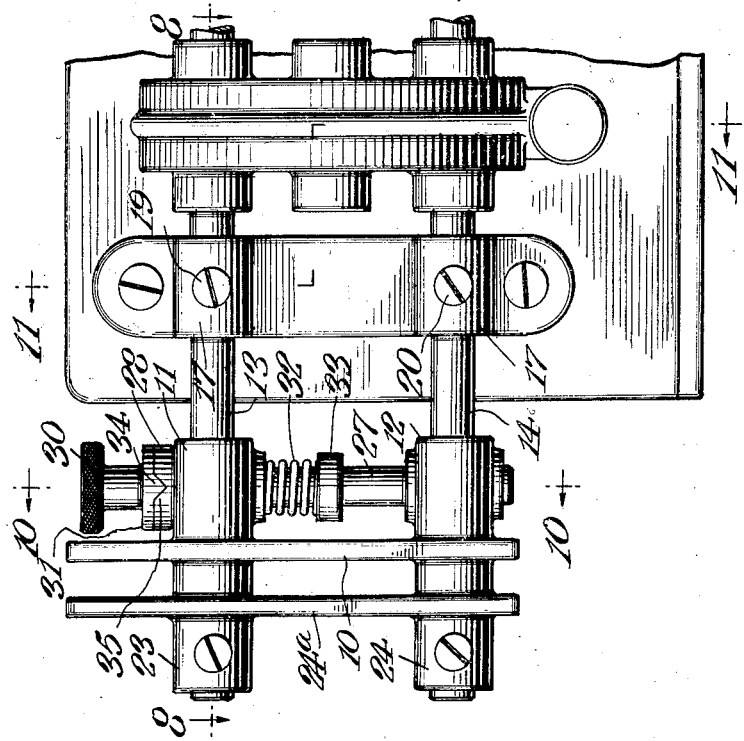
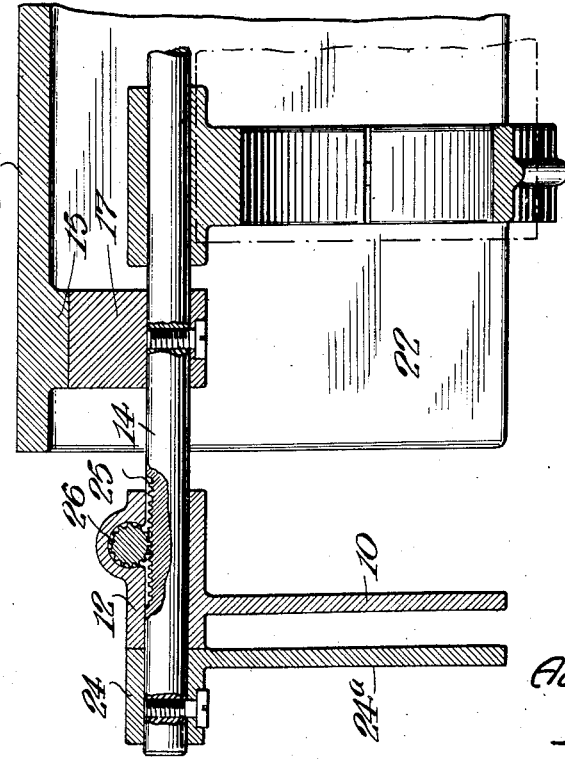
INVENTOR
Augusto Dina
BY
Howard W. Dix
ATTORNEY March 14, 1933.  A. DINA  1,900,920
GATE FOR MOTION PICTURE MACHINES
Filed Nov. 4, 1929  8 Sheets-Sheet 7
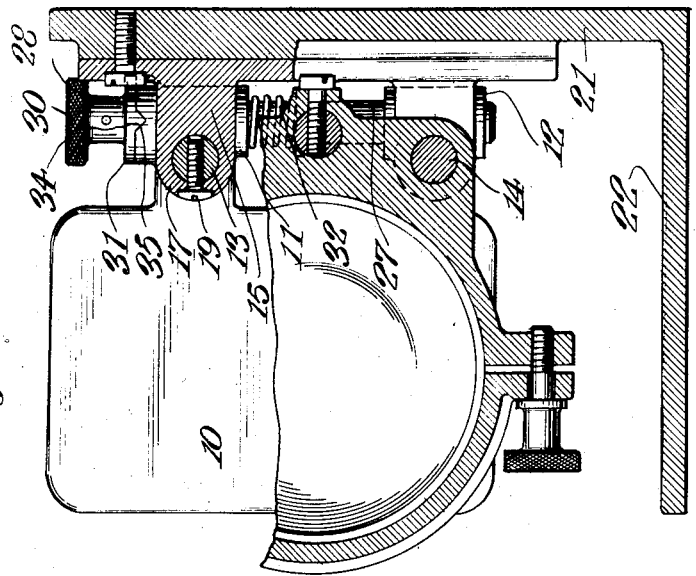
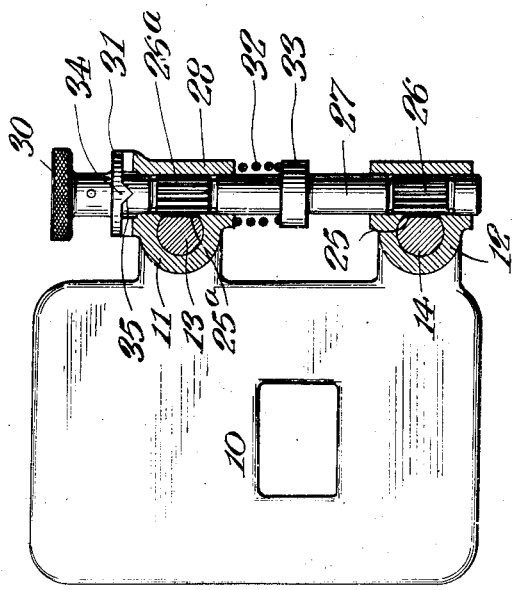
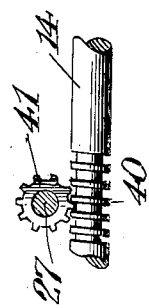
INVENTOR
Augusto Dina
BY
ATTORNEY March 14, 1933.   A. DINA   1,900,920
GATE FOR MOTION PICTURE MACHINES
Filed Nov. 4, 1929   8 Sheets-Sheet 8
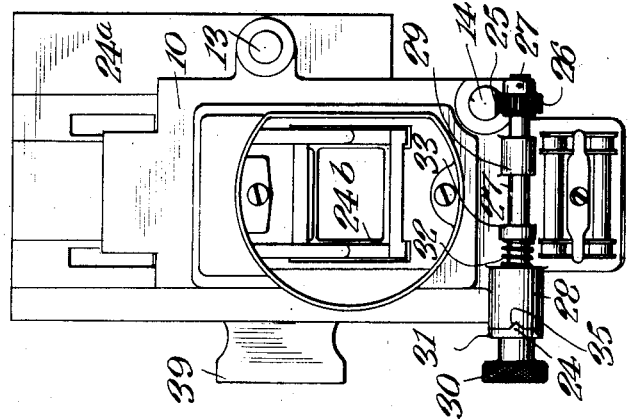
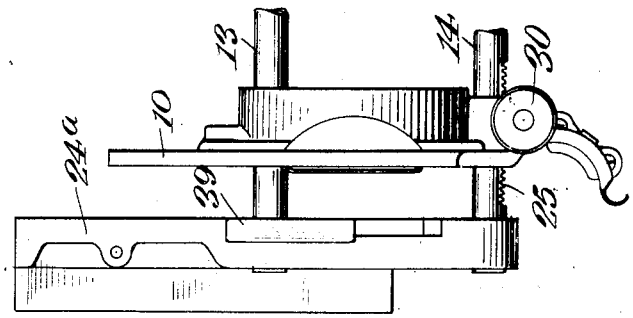
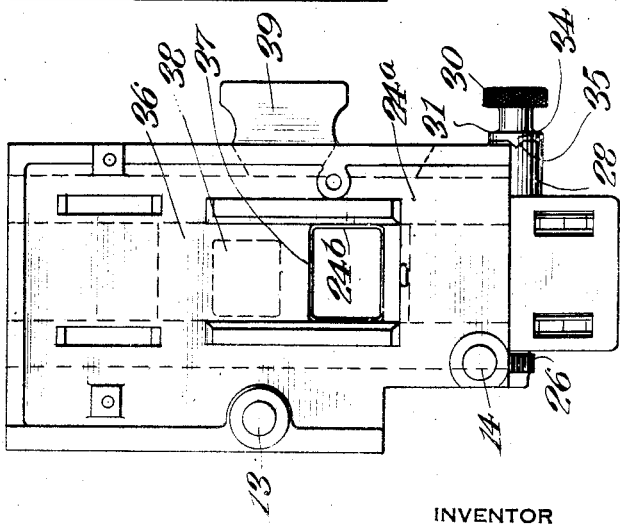
INVENTOR
Augusto Dina
BY
Howard W. Dix
ATTORNEY Patented Mar. 14, 1933

1,900,920

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

GATE FOR MOTION PICTURE MACHINES

Application filed November 4, 1929. Serial No. 404,543.

This invention relates to new and useful improvements in driving and locking means for motion picture apparatus and especially for driving the film gate door on motion picture projectors.

A main object of the invention is to provide a simple, compact, and efficient mechanism whereby the door may be driven preferably by a single driving member from one position to another and automatically and securely locked in positon at each end of the path of movement.

A further object is to provide such a mechanism as will permit the door being securely locked in either extreme position and then unlocked and moved to the other position and locked therein, all accomplished by a simple unidirectional movement of the hand in one direction or the other.

A still further object is to provide means whereby the locking mechanism can be adjusted or reset to accommodate its actions to variations in the length of movement of the door.

Yet another object is to provide a simple, compact mechanism wherein the driving element and the door and their associated parts are so designed and related that the parts will move in such synchronism that there will be a maximum of resistance to being unlocked but a minimum of resistance to being moved after being unlocked.

Further and more specific objects, features, and advantages will more clearly appear from the detailed description given below when taken in connection with the accompanying drawings which form part of the specification and which illustrate one preferred present form of the invention.

Generally contemplated, the invention comprises a driven member such as the film gate door which preferably has a predetermined path of movement. This door is driven from one end of its travel to the other preferably by a single driving member operated by a unidirectional movement of the hand for any given path to be traversed. The parts are so designed that as the door reaches the end position, the driving mechanism becomes automatically locked so that the door is firmly secured in that position. When locked and it is desired to move the door, it is merely necessary in the preferred construction herein to exert a turning effort on the driving member and effect the unlocking of this element after which the continued turning motion of the driver in the same direction will move the door to the other end of its travel where automatic synchronous locking takes place.

More particularly, the device includes a door slidable along a support such as two or more rods. Along one of the supports or rods are disposed teeth engaged by a gear on the driver element. This gear is on a shaft turned by a knob or lever or other operated member. The gear shaft and knob have a temporary cross-wise motion against a spring action which normally tends to force the shaft in one longitudinal direction. The knob has projections adapted to engage in slots, notches, or recesses on the driven member which when in engagement, lock the knob and drive shaft from further turning.

To unlock and drive, it is merely necessary to start turning the knob. The engagement of the projections and recesses is such as to resist dis-engagement up to a certain pressure and beyond that they are forcibly dis-engaged and the drive can continue its turning movement with slight longitudinal or crosswise displacement to allow for withdrawal of the projections from the notches or recesses. The parts are so designed that when the door has exactly achieved the desired end of its path of movement, the driving element will have been turned so that its projections will fall into the notches to lock the driver securely in place.

Furthermore, the supporting rods may be provided with a worm instead of a gear and the engaging gear may be a worm gear so that whenever the rod is turned, the gear and its shaft can be turned to adjust the driver knob or member in its locking position or in another position independent of any movement of the door. This will permit the device to be locked in other positions of the door element than its extreme end positions if desired.

Therefore, the only motion required of the driver is a turning movement which initially results in a slight displacement cross-wise or longitudinally of the drive shaft to unlock it and then continues uninterruptedly to forward the door in a smooth and continuous manner.

The preferred present form of the invention is illustrated in the drawings, in which, Fig. 1 is a perspective view of the mechanism assembled on a projector;

Fig. 2 is a plan view of the mechanism;

Fig. 3 is a side elevation of the mechanism;

Fig. 4 is a horizontal section taken on the line 4—4 of Fig. 3;

Fig. 5 is a transverse section taken on the line 5—5 of Fig. 2;

Fig. 6 is a transverse section taken on the line 6—6 of Fig. 3;

Fig. 7 is a perspective view of the turning knob and its projections;

Fig. 8 is a horizontal section taken on the line 8—8 of Fig. 9 and showing a modified form of the invention;

Fig. 9 is a side elevation of this modification;

Fig. 10 is a transverse section taken on the line 10—10 of Fig. 9;

Fig. 11 is a transverse section taken on the line 11—11 of Fig. 9;

Fig. 12 is a rear elevation of the gate and the door mechanism;

Fig. 13 is a side elevation of the same with the door removed some distance from the gate;

Fig. 14 is a front elevation of the gate and door shown in Fig. 12; and,

Fig. 15 is a perspective view of a modified form of the operating mechanism;

Figure 1:
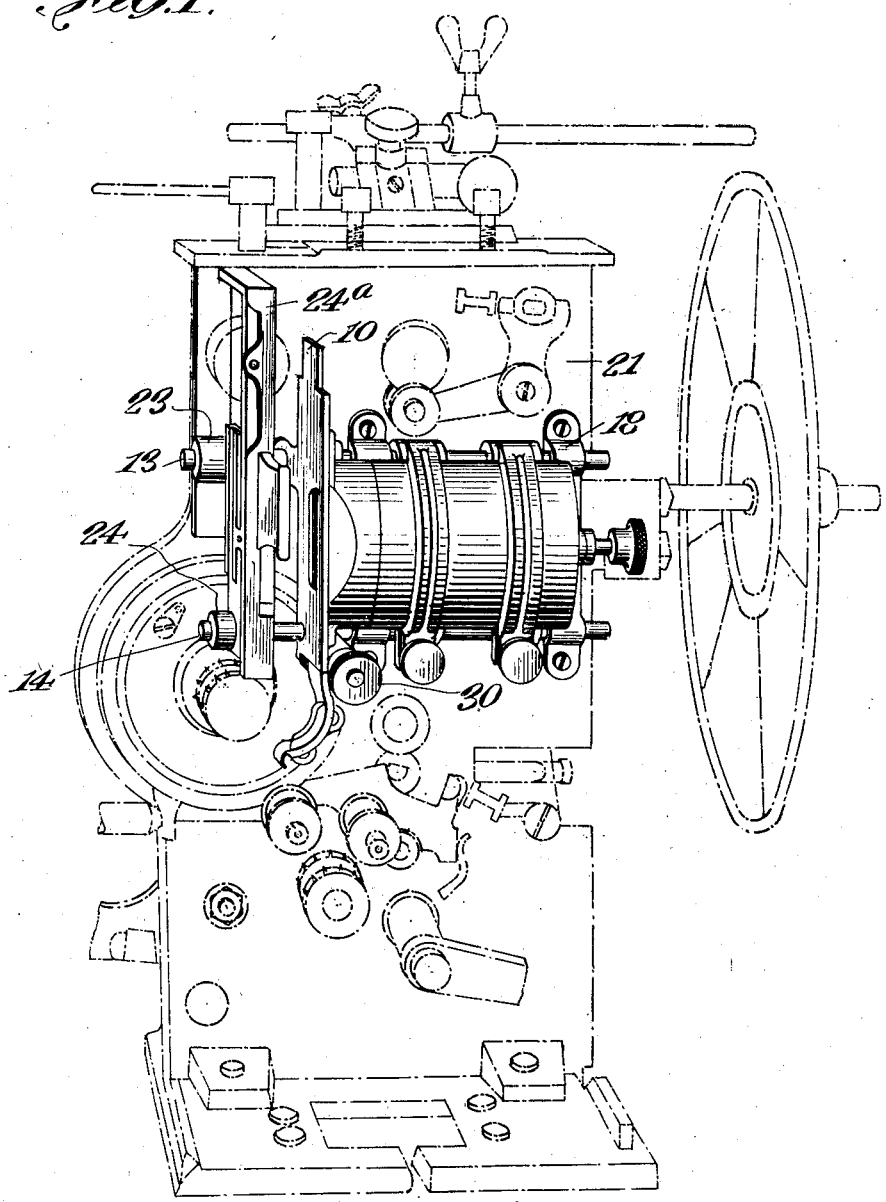

As shown in the drawings, the present preferred form of the invention may comprise a member 10 which is preferably a gate door to be moved. This door may be formed with collars 11 and 12 which are slidable along a support such as rods 13 and 14. These supports are preferably mounted on brackets such as 15 and 16 having collars 17 and 18 to receive the rods 13 and 14 which may be held therein by means of set screws such as 19 and 20. The brackets are preferably fastened to a supporting partition such as 21 which is mounted on a suitable base member 22.

The collars 11 and 12 are preferably adapted to slide along the rods 13 and 14 between the adjacent edges of the collars 17 and 18 and stop members such as collars 23 and 24 on the outer ends of the rods 13 and 14. These collars 23 and 24 support the well known and usual film trap gate 24a. Thus the path of travel of the door 10 is limited and determined. In order to drive the door 10, the lower collar 12 is cut away to expose a predetermined portion of the rod 14, the upper surface of which is provided with a straight rack 25. This rack is engaged by a gear 26 mounted on a shaft 27 extending at right angles to the rod 14 and parallel to the driven door 10. The shaft 27 is journalled between bosses 28 and 29 mounted on the door 10, and the outer end of the shaft 27 has fastened thereon a hand operated member such as a knob 30 having a hub or head 31 lying adjacent the face of the boss 28. The knob 30 may or may not be provided with heat dissipating means. A spring 32 is disposed between the opposite faces of the boss 28 and a collar 33 on the shaft 27 and tends to move the shaft 27 to the right at all times.

The adjacent faces of the hub 31 and the boss 28 are provided with engaging projections such as 34 and notches or recesses 35 which when engaged as shown in Fig. 2, will tend to lock the shaft 27 from movement and lock the knob 30 to the boss 28. It will be observed that there are several of these projections and notches or recesses on the adjacent faces above mentioned and it is to be noted that they may be reversed as to position since the projections could be on the boss 28 and the notches or recesses on the hub 31. Noting the amount of the path of movement of the door 10 and the size of the rack 25 and the gear 26, these parts are so designed, that when the door 10 is in one end position, the projections and notches will be in engagement and when the door 10 is in the other extreme position a like engagement will result. There need be only one notch and one projection as long as their position relative to the motion of the other parts is properly designed to cause locking at the desired points.

With parts in the position shown in Figs. 2, 3, and 4 it will be noticed that the door 10 is locked in one end position. To move it from this position to the other end position, it is merely necessary to grasp the knob 30 in the hand and commence turning it. The first movement of the knob will cause the lateral edges of the projections 34 and the engaged notch or recess 35 to slide against each other and, acting like a cam, will cause the projection to be moved or displaced cross-wise until it is out of the recess, after which the continued turning movement of the knob will turn the shaft 27 and through the gear 26 and the rack 25 will cause the door 10 to move to its other end position.

This initial movement of the knob in an angular direction will naturally cause the shaft 27 to be displaced cross-wise against the action of the spring 32 until the projections and notches are cleared of each other but this displacement is not sufficient to unmesh the gear 26 from the rack 25. As previously stated the parts as to dimension are so designed that just as the door 10 reaches its other end position then the projections and notches are ready again to engage and cause an automatic locking of the parts in the manner set forth. The illustration in Fig. 7 shows the preferred form of the projections and their sides are disposed preferably at forty-five degrees to the plane of movement of the adjacent faces of the hub 31 and the boss 28 since the maximum resistance to unlocking is afforded consistent with a not too great effort to unlock and turn the knob.

In Figs. 8, 9, 10, and 11 are shown a modification in which the adjusting mechanism is mounted vertically on the door 10 instead of horizontally. Therein the shaft 27 has an extra gear 26a to mesh with an extra rack 25a on the rod 13. Otherwise the mechanism is the same except for the change in position.

In Fig. 15 the rod 14 is supplied with a worm 40 and the shaft 27 with a worm gear 41 so that the shaft or rod 14 can be turned angularly to turn the worm 40 and thus turn the worm gear 41 and turn the shaft 27 without laterally moving the door 10 when such an extra adjustment is desired.

In Figs. 12, 13, and 14 will be seen the usual standard gate and door with the adjusting and door-moving mechanism mounted thereon. In this case the gate has an aperture 24b therein and a slide plate 36 having two apertures 37 and 38 therein which plate 36 can be moved vertically to present either the aperture 37 or the aperture 38 before the aperture 24b. This slide plate 36 is actuated by the handle 39. It is within the realm of possibilities that the same kind of mechanism which is associated with the knob 30 may be used to actuate and adjust the slide plate 36 if desired.

In summation, it will be seen that when the parts are in the position shown in Figs. 2, 3, and 4 with the door 10 locked in one of its end positions, no normal movement can occur to it without turning the shaft 27. Therefore it is securely locked against accidental or working jars, vibrations, and the like, and against any positive pushing against its face. To start it from this position, however, it is merely necessary to commence turning the knob 30. The initial movement thereof as above explained will automatically cause a slight displacement cross-wise of the shaft 27 to withdraw the projections from the notches and a further continuing of the turning movement will drive the door 10 to the other end of its predetermined path. If during the movement it is desired to lock the door 10 in an intermediate position, then with the construction shown in Fig. 15, the turning of the rod 14 will permit the shaft 27 to be turned independently of the door 10 and cause the locking to take place at that point as above described. This construction therefore will afford the maximum resistance to unlocking possible with any similar arrangement of parts, but will afford, when unlocked, a smooth running and simple driving mechanism. This synchronous operation and design of the parts is such that automatic locking takes place merely by turning of the knob to move the door 10 from one position to the other.

From the foregoing description it will be seen that an improved gate and operating means therefore, all for a motion picture projection machine, has been provided, and that the gate and operating means are of fewer number of parts and acts to positively and automatically lock the gate in its end positions.

While the invention has been described in detail and with respect to a present preferred form thereof, it is not to be limited to such details and forms since many changes may be made and the invention embodied in many other forms and modifications without departing from the spirit and scope of the invention in its broader aspects. Hence it is desired to cover any and all forms and modifications coming within the language and scope of any one or more of the appended claims.

What is claimed, is,

1. A door driving and locking mechanism for motion picture machines which comprises a driven film gate door, a member for driving said door between predetermined limits of movement, means for automatically locking the door and said member together in predetermined positions of the door, and means whereby the locking or unlocking of the door and said member and the movement of the door by the driving member is effected by a single continuous movement of the hand thereon in one direction or the other.

2. A door driving and locking device for motion picture machines which comprises a driven gate door, a driving member, means permitting the member to drive the door away from the gate by a continuous movement thereof, in one direction or another, and means for automatically locking said drive member at predetermined points in the movement of the door.

3. A door driving and locking device for motion picture machines which comprises a driven gate door having predetermined limits to its path of movement, a driving member, means whereby the driving member may move the door by a single continuous movement in one direction or another, and means whereby the parts are so synchronously operated that when the door reaches the ends of its path of movement in either direction the driving member will be automatically locked against further movement.

4. A door driving and locking device for motion picture machines which comprises a driven gate door, a driving member therefor, means permitting the door to be driven by the member away from the gate in a continuous movement thereof in one direction or another, means for automatically locking said drive member at predetermined points in the movement of the door, and means for adjusting the driving member at an intermediate point in the movement of the door and without moving the door.

5. A driving and locking device for motion picture machines which comprises a driven gate door, a support on which it is movably mounted, means on the support for limiting the movement of the door between predetermined points, a drive member on said door and engaging said support, said driving member adapted to be given a movement in a given direction in a continuous manner to move the door away from the gate along the supports, and means whereby the driving member is automatically locked to the door when the door reaches a predetermined point in its travel.

6. A driving and locking device for motion picture machines which comprises a driven door, a support on which it is slidably mounted, a drive shaft on the door, means whereby the drive shaft and the support are engaged for driving the door along the support, means for locking the drive shaft to the door in predetermined positions of the door, and means whereby the drive shaft is unlocked from the door upon the initiation of continuous movement of the drive shaft in one direction or another, and means whereby the continuous movement of the shaft will move the door along the support.

7. A driving and locking device for motion picture machines which comprises a driven gate door, a support on which it is slidably mounted, a drive shaft on the door, means whereby the drive shaft and the support are engaged for driving the door along the support, means for locking the drive shaft to the door in predetermined positions of the door, means whereby the drive shaft is unlocked from the door upon the initiation of continuous movement to the drive shaft in one direction or another, means whereby the continuation of such movement will move the door along the support, and means whereby the drive shaft will automatically be locked to the door again when the door has reached another predetermined point in its travel.

8. A driving and locking device for motion picture machines which comprises a driven gate door, a support on which it is slidably mounted, a drive shaft on the door, means whereby the drive shaft and the support are engaged for driving the door along the support, means for locking the drive shaft to the door in predetermined positions of the door, means whereby the drive shaft is unlocked from the door upon the initiation of continuous movement to the drive shaft in one direction or another, and means whereby the continuation of such movement will move the door along the support, means on the support and cooperating with the drive shaft whereby the drive shaft can be adjusted independently of the movement of the door, to effect locking before the end of movement of the door has been achieved.

9. A driving and locking device for motion picture machines which comprises a driven gate door, a support on which it is slidable, a rack on said support, a drive shaft on the door, a gear on said shaft, means for turning said drive shaft, means for locking said shaft to the door in predetermined positions of the door, and means whereby the locking means is released by the same turning movement which moves the door along the support.

10. A driving and locking device for motion picture machines which comprises a driven gate door, a support on which it is slidable, a rack on said support, a drive shaft on the door, a gear on said shaft, means for turning said drive shaft to move the door along the support, interengaging projections and notches on the drive shaft and the door to lock the drive shaft to the door in predetermined positions of the door, said interengaging projections and notches permitting release of their engagement by the initiation of the same movement which drives the door along the support.

11. A driving and locking device for motion picture machines which comprises a driven gate door, a support on which it is slidable, a rack on said support, a drive shaft on the door, a gear on said shaft, means for turning said drive shaft to move the door along the support, interengaging projections and notches on the drive shaft and the door to lock the drive shaft to the door in predetermined positions of the door, means tending at all times to hold the projections and notches in engagement, said interengaging projections and notches being shaped to permit release of their engagement by the initiation of the same turning movement of the drive shaft which moves the door along the support, the design of the parts being such that as the door reaches the end of its travel in a given direction, the projections and notches will be in position to again engage and lock the drive shaft to the door.

12. A driving and locking device for motion picture machines which comprises a driven gate door, a support on which it is slidable, a rack on said support, a drive shaft on the door, a gear on said shaft, means for turning said drive shaft to move the door along the support, interengaging projections and notches on the drive shaft and the door to lock the drive shaft to the door in predetermined positions of the door, means tending at all times to hold the projections and notches in engagement, said interengaging projections and notches shaped to permit their release by the initiation of the same turning movement of the drive shaft which moves the door along the support, the design of the parts being such that as the door reaches the end of its travel in a given direction the projections and notches will be in position to again engage and lock the drive shaft to the door, and means whereby the drive shaft can be adjusted independently of movement of the door.

13. A driving and locking device for motion picture machines which comprises a driven gate door, a rod on which said door is slidable, a driving shaft on said door, a worm gear on said driving shaft, a worm on said rod meshing with said worm gear, means for turning the drive shaft to move the door along the support, means for locking the driving shaft to the door at predetermined points of its travel, and means for turning the rod to adjust the drive shaft independent of movement of the door along the support to give adjustment for locking at a particular point.

14. A driving and locking device for motion picture machines which comprises a driven gate door, a rod on which said door is slidably supported, a rack on said rod, a driving shaft on said door, a gear on said driving shaft meshing with the rack, a manually operated element on the drive shaft to enable it to be turned, said manually operated element and door having interengaging projections and notches, and means causing the engagement of said projections and notches when the door has arrived at predetermined points in its travel.

15. A driving and locking device for motion picture machines which comprises a driven gate door, a rod on which said door is slidably mounted, a rack on said rod, a driving shaft on said door, a gear on said driving shaft meshing with the rack, a manually operated element on the drive shaft to enable it to be turned, said manually operable element and door having interengaging projections and notches, and means causing the engagement of said projections and notches when the door has arrived at predetermined points in its travel, and means whereby the locking and unlocking of said projections and notches, and the movement of the door by the turning of the drive shaft is effected by a single continuous movement of the driving element in one direction or another.

16. A driving and locking device for motion picture machines which comprises an apertured film gate, a gate door with an aperture therein to register with that in the gate, supports on which the door is slidable, a gear, a gear shaft, and an operating knob on the door, a rack on the supports with which the gear meshes, and means for automatically locking the door in position against the gate as the knob is turned.

This specification signed this 1st day of November, 1929.

AUGUSTO DINA.